United States Patent
Shinomiya

(10) Patent No.: US 8,427,485 B2
(45) Date of Patent: Apr. 23, 2013

(54) INFORMATION PROCESSING DEVICE, IMAGE DISPLAY DEVICE, AND INFORMATION PROCESSING METHOD

(75) Inventor: Toru Shinomiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 407 days.

(21) Appl. No.: 12/796,807

(22) Filed: Jun. 9, 2010

(65) Prior Publication Data
US 2010/0321394 A1 Dec. 23, 2010

(30) Foreign Application Priority Data

Jun. 23, 2009 (JP) ................................. 2009-148372

(51) Int. Cl.
G06F 15/00 (2006.01)
H04N 5/14 (2006.01)
H04N 9/64 (2006.01)
G06K 9/54 (2006.01)
G06K 9/60 (2006.01)

(52) U.S. Cl.
USPC ............................ 345/501; 348/571; 382/307

(58) Field of Classification Search .................. None
See application file for complete search history.

(56) References Cited

U.S. PATENT DOCUMENTS

| 7,068,253 B2 * | 6/2006 | Kudo et al. ..................... 345/99 |
| 7,352,372 B2 * | 4/2008 | Chow et al. ..................... 345/564 |
| 8,166,213 B2 * | 4/2012 | Simmons et al. ............... 710/52 |

FOREIGN PATENT DOCUMENTS

| CN | 1496184 A | 5/2004 |
| JP | 2006-140755 A | 6/2006 |
| JP | 2008-250533 A | 10/2008 |

* cited by examiner

Primary Examiner — Kee M Tung
Assistant Examiner — Haixia Du
(74) Attorney, Agent, or Firm — ALG Intellectial Property, LLC

(57) ABSTRACT

An information processing device includes: a first processing unit which asserts a first chip select signal or a second chip select signal in accordance with an address space to access; and a second processing unit accessible by the first processing unit by a first access method or a second access method, wherein when asserting the first chip select signal, the first processing unit accesses the second processing unit by the first access method, and when asserting the second chip select signal, the first processing unit accesses the second processing unit by the second access method.

9 Claims, 12 Drawing Sheets

| ACCESS TARGET | ADDRESS RANGE OF FIRST PROCESSING UNIT | ADDRESS RANGE OF SECOND PROCESSING UNIT |
|---|---|---|
| ⋮ | ⋮ | ⋮ |
| CONTROL REGISTER OF SECOND PROCESSING UNIT | 0x0400_0000~0x0400_0fff | 0x0000~0x0fff |
| DATA BUFFER OF SECOND PROCESSING UNIT | 0x0400_1000~0x0400_0fff | 0x1000~0x0fff |
| ⋮ | ⋮ | ⋮ |

| AD3 | CS1 | CS2 | ... | CSN | CS_0 |
|---|---|---|---|---|---|
| OTHER THAN 0x0400 | H/L | H/L | ... | H/L | H |
| 0x0400 | L | H | ... | H | L |
| 0x0400 | H | L | ... | H | L |
| ⋮ | ⋮ | ⋮ | | ⋮ | ⋮ |
| 0x0400 | H | H | ... | L | L |
| 0x0400 | H | H | ... | H | H |

FIG. 5

INFORMATION PROCESSING DEVICE, IMAGE DISPLAY DEVICE, AND INFORMATION PROCESSING METHOD

CROSS-REFERENCE

The present application claims priority from Japanese Patent Application No. 2009-148372 filed on Jun. 23, 2009, which is hereby incorporated by reference in its entirety.

BACKGROUND

Recently, the function of a circuit system as an information processing device has become more and more complicated with a demand for higher performance of the information processing device from users. Thus, the circuit system includes a plurality of integrated circuits integrating processing circuits or the like for providing respective functions. A typical type of circuit system contains integrated circuits such as a central processing unit (CPU) and an interface circuit, and the integrated circuits are connected with one another via a bus.

This type of circuit system provides desired functions under the control of the CPU which accesses and controls other integrated circuits. When accessing other integrated circuits, the CPU outputs a chip select signal as a device select signal to select an access target device, and accesses the selected integrated circuit via the bus. In this case, the CPU reads and writes data from and to the access target device by using an access control signal and in access timing corresponding to the access target device.

The circuit system including the CPU which accesses the device by using the chip select signal has been disclosed in Japanese Patent Publication No. 2006-140755 and Japanese Patent Publication No. 2008-250533, for example. According to a communication system shown in Japanese Patent Publication No. 2006-140755 which has a CPU outputting plural types of chip select signal and connected with plural devices, the chip select signals different for each device are allocated to the respective devices, and the chip select signal corresponding to the access target device is activated when the target device is accessed. According to the technology shown in Japanese Patent Publication No. 2008-250533, chip select signals from different CPUs are allocated to the same device, and connection of the bus is switched such that reduction of control time can be achieved by simple circuit structure.

In case of the technologies disclosed in Japanese Patent Publication No. 2006-140755 and Japanese Patent Publication No. 2008-250533, the device allocated to the chip select signal as access target is accessed by using the access control signal and in the access timing determined beforehand in correspondence with the device. Thus, when the devices are accessible by plural access methods, the access timing and others need to be rewritten by a control register or the like. In this case, the access methods cannot be switched at high speed.

SUMMARY

Various embodiments may provide an information processing device, an image display device, an information processing method and others capable of switching plural methods at high speed for accessing a device accessible by the plural methods for access control of the device.

An information processing device according to at least one embodiment of the disclosure includes: a first processing unit which asserts a first chip select signal or a second chip select signal in accordance with an address space to access; and a second processing unit accessible by the first processing unit by a first access method or a second access method. When asserting the first chip select signal, the first processing unit accesses the second processing unit by the first access method. When asserting the second chip select signal, the first processing unit accesses the second processing unit by the second access method.

According to this structure, the first processing unit can access the second processing unit accessible by plural access methods while switching the access methods only by asserting the first chip select signal or the second chip select signal without resetting access timing or the like for each address space corresponding to the chip select signal. Thus, the necessity for rewriting the control register or the like by software is eliminated, and the first processing unit can access the second processing unit while switching one of the plural access methods at high speed.

According to at least one embodiment of the disclosure, the second processing unit includes a control register accessible by the first processing unit, and a data buffer accessible by the first processing unit. When asserting the first chip select signal, the first processing unit performs register access for accessing the control register. When asserting the second chip select signal, the first processing unit performs block access which repeatedly designates successive addresses for accessing the data buffer.

According to this structure, the access methods can be switched at high speed between the register access for accessing the control register of the second processing unit by the first processing unit and the block access for accessing the data buffer of the second processing unit by the first processing unit by changing the chip select signal asserted by the first processing unit.

According to at least one embodiment of the disclosure, the second processing unit includes a host controller which has a plurality of interface circuits connected with a serial bus, and an arbiter which arbitrates transmission of read data or write data between the control register, the data buffer, and the host controller. The data buffer buffers data transmitted via the serial bus connected with respective interface circuits included in the plural interface circuits. Serial/parallel conversion or parallel/serial conversion of the data transmitted via the serial bus connected with the interface circuits included in the plural interface circuits and arbitrated by the arbiter is performed.

According to this structure, the second processing unit which controls data transmission via the plural interface circuits can be accessed while switching the access methods at high speed.

According to at least one embodiment of the disclosure, the information processing device further includes: a supplementary processing unit which has a decoder for decoding the first chip select signal, the second chip select signal, and the address corresponding to the address space accessed by the first processing unit. In this case, the supplementary processing unit selects the second processing unit based on a decode result from the decoder.

According to this structure which includes the supplementary processing unit having the decoder for decoding the addresses, the access methods can be switched at high speed by using simple structure and a reduced number of access signals.

According to at least one embodiment of the disclosure, the supplementary processing unit switches between change timing of an access control signal outputted to the second processing unit by the first access method and change timing of an access control signal outputted to the second processing unit by the second access method based on the decode result from the decoder.

According to this structure, the access methods can be switched flexibly and at high speed.

According to at least one embodiment of the disclosure, the type of access control signal used in the first access method and the type of access control signal used in the second access method are switched based on the decode result from the decoder.

According to this structure, the access methods can be switched flexibly and at high speed.

An image display device which displays an image corresponding to image data according to at least one embodiment of the disclosure includes: the information processing device described above which receives image data as serial data via a device connected with the second processing unit and outputs the image data converted into parallel data; an image processing unit which performs image processing for the image data received from the information processing device; and an image display unit which displays an image corresponding to the image data after the image processing by the image processing unit.

According to this structure, image display based on image data received from a desired device and data transmission between this device and the image display device can be achieved.

An information processing method for an information processing device having a first processing unit and a second processing unit accessed by the first processing unit according to at least one embodiment of the disclosure includes: allowing the first processing unit to assert a first chip select signal or a second chip select signal according to an address space to be accessed; and allowing the first processing unit to access the second processing unit by an access method corresponding to the chip select signal asserted by the first processing unit. The first processing unit accesses the second processing unit by a first access method when asserting the first chip select signal, and accesses the second processing unit by a second access method when asserting the second chip select signal.

According to this method, the first processing unit can access the second processing unit accessible by plural access methods while switching the access methods only by asserting the first chip select signal or the second chip select signal without resetting access timing or the like for each address space corresponding to the chip select signal. Thus, the necessity for rewriting the control register or the like by software is eliminated, and the first processing unit can access the second processing unit while switching one of the plural access methods at high speed.

BRIEF DESCRIPTION OF THE DRAWINGS

Non-limiting and non-exhaustive embodiments of the present disclosure will be described with reference to the accompanying drawings, wherein like reference numbers reference like elements.

FIG. 5 illustrates an operation example of a decoder.

DESCRIPTION OF EMBODIMENT

An embodiment according to the invention is hereinafter described with reference to the drawings. It is intended that the scope of the invention according to the appended claims is not limited to the embodiment described herein. It should be also understood that not all structures and parts explained herein are essential constituent elements for the invention.

Figure 1:
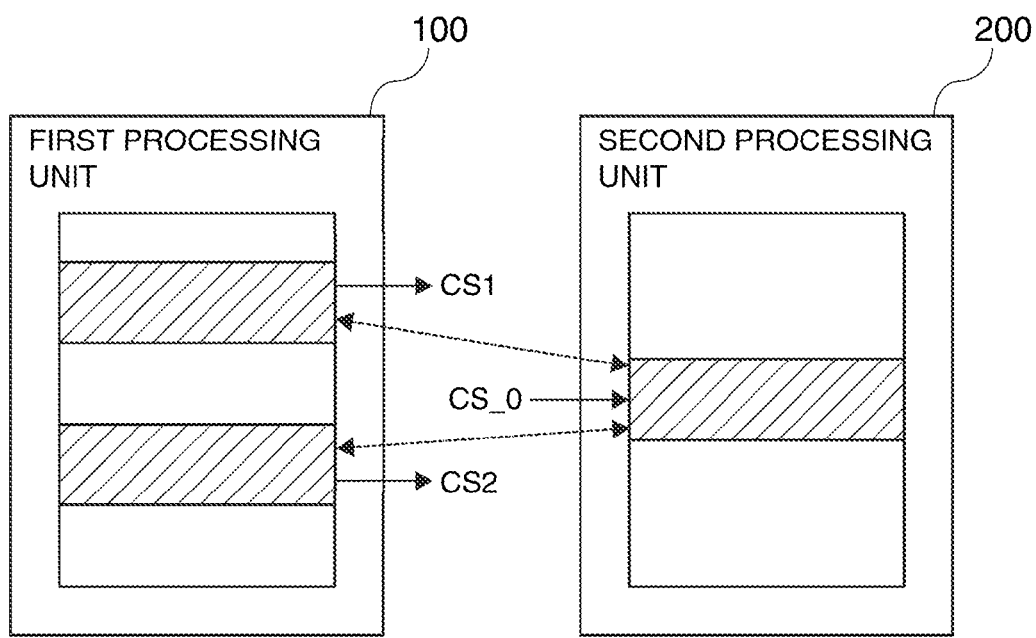
FIG. 1 illustrates the general structure of an information processing device according to an embodiment of the invention.

FIG. 1 schematically illustrates the structure of an information processing device according to an embodiment of the invention. According to the example shown in FIG. 1, the information processing device has a plurality of processing units, and a first processing unit accesses only a second processing unit. However, the first processing unit may be so structured as to access plural processing units.

An information processing device 10 as a circuit system has a first processing unit (first circuit or first integrated circuit) 100 and a second processing unit (second circuit or second integrated circuit) 200. The first processing unit 100 accesses the second processing unit 200. The second processing unit 200 corresponds to a device in a wide sense, and is accessible by plural methods performed by the first processing unit 100. Thus, the first processing unit 100 asserts any of plural chip select signals connected between the first processing unit 100 and the second processing unit 200 to select the second processing unit 200, and performs control for accessing the second processing unit 200. When the information processing device 10 has three or more processing units, the first processing unit 100 asserts any of plural chip select signals connected between the first processing unit 100 and one or plural processing units including the second processing unit 200 to select the access target processing unit, and performs control for accessing the selected processing unit. Accordingly, in issuing an access cycle, the first processing unit 100 asserts a chip select signal determined in advance for each address space to be accessed. The second processing unit 200 receives an access control signal including the chip select signal. When the chip select signal is asserted, the second processing unit 200 is accessed by the first processing unit 100 according to the access control signal.

In this embodiment, an address space is provided for each of two resources of the second processing unit 200 and allocated to an address space to be accessed by the first processing unit 100. A chip select signal to be asserted when selected as the access target is allocated to each of the address spaces corresponding to the two resources. The first processing unit 100 asserts a first chip select signal CS1 or a second chip select signal CS2 in accordance with the address space to be accessed when accessing the second processing unit 200. In this case, the first processing unit 100 switches access methods for accessing the second processing unit 200 according to the resources of the second processing unit 200 to be accessed. In this embodiment, therefore, the first processing unit 100 asserts either the first chip select signal CS1 or the second chip select signal CS2 from the first processing unit 100 as a chip select signal CS_0 and accesses the second processing unit 200 by the access method corresponding to the chip select signal asserted by the first processing unit 100.

Accordingly, it is only required that the access control signal and the access timing are determined for each address space to be accessed by the first processing unit 100. Even when the second processing unit 200 is accessible by plural access methods, any of the plural chip select signals is only required to be asserted for the second processing unit 200. Thus, control register or the like for setting access timing and others for accessing one address space need not be rewritten every time the address space is accessed. Consequently, the first processing unit 100 can switch one of plural access methods at high speed for accessing the second processing unit 200 without rewriting control register or the like by software.

The details of the information processing device 10 in this embodiment are now explained.

Figure 2:
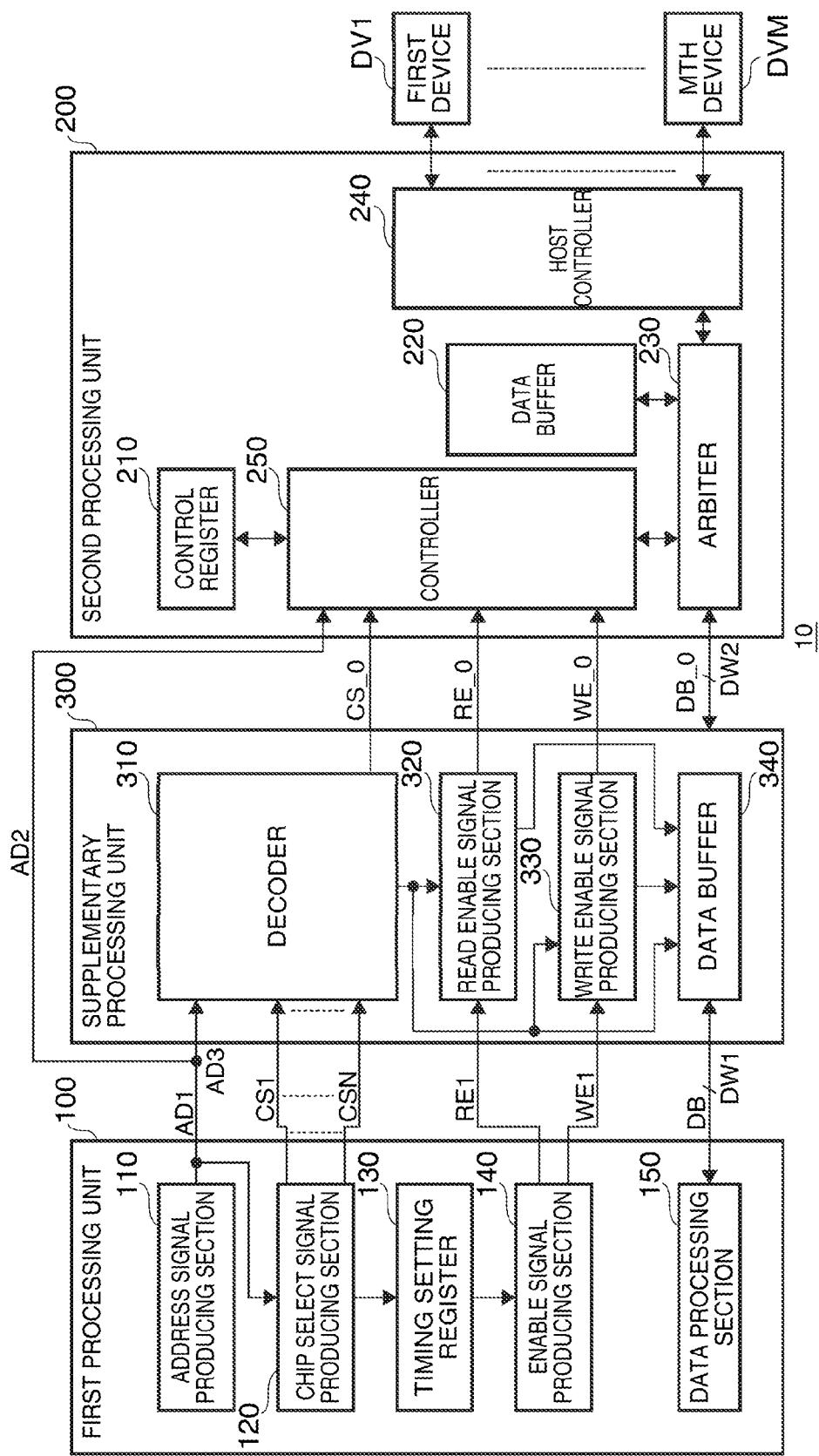
FIG. 2 is a block diagram showing a detailed structure example of the information processing device according to this embodiment.

FIG. 2 is a block diagram showing the detailed structure example of the information processing device 10 in this embodiment. In FIG. 2, the same reference numbers are given to parts same as those shown in FIG. 1, and the same explanation is not repeated.

According to this embodiment, the information processing device 10 includes the first processing unit 100, the second processing unit 200, and a supplementary processing unit (supplementary circuit or supplementary integrated circuit) 300. A data bus having a bus width DW1 connects between the first processing unit 100 and the supplementary processing unit 300 such that data can be transmitted and received therebetween via the data bus. Similarly, a data bus having a bus width DW2 (0<DW1≦DW2) connects between the second processing unit 200 and the supplementary processing unit 300 such that data can be transmitted and received therebetween via the data bus. For example, the bus width DW1 is "16", and the bus width DW2 is "32". In the information processing device 10 having this structure, the supplementary processing unit 300 having received an access control signal from the first processing unit 100 produces an access control signal for the second processing unit 200, and conducts serial/parallel conversion for converting serial data into parallel data or parallel/serial conversion for converting parallel data into serial data. In this case, the access control signal contains a chip select signal, a read enable signal, and a write enable signal. Thus, the first processing unit 100 accesses the second processing unit 200 via the supplementary processing unit 300.

The first processing unit 100 includes an address signal producing section 110, a chip select signal producing section 120, a timing setting register 130, an enable signal producing section 140, and a data processing section 150.

The address signal producing section 110 produces an address AD1 corresponding to an address space to be accessed by the first processing unit 100. At least a lower address AD2 of the address AD1 (for example, a lower bit of the address AD1) is inputted to the second processing unit 200, and at least an upper address AD3 of the address AD1 (for example, an upper bit of the address AD1) is inputted to the supplementary processing unit 300.

The chip select signal producing section 120 asserts a chip select signal corresponding to the address space to be accessed by the first processing unit 100. The chip select signal to be asserted is allocated to each address space to be accessed by the first processing unit 100 in advance, and the chip select signal producing section 120 is so designed as to assert a chip select signal included in first chip select signal CS1 through Nth chip select signal (N: 2 or larger integer) and corresponding to the address AD1 produced by the address signal producing section 110. In this embodiment, it is assumed that N is "2".

The timing setting register 130 retains control data for specifying the timing of the access control signal for each address space to be accessed by the first processing unit 100, and outputs timing information for accessing the address space corresponding to the chip select signal asserted by the chip select signal producing section 120.

The enable signal producing section 140 produces a read enable signal RE1 or a write enable signal WE1 based on the timing information received from the timing setting register 130. While the enable signal producing section 140 produces the read enable signal RE1 and the write enable signal WE1 in this embodiment, the invention is not limited to this specific example.

The data processing unit 150 receives read data from the supplementary processing unit 300 in synchronization with the read enable signal RE1 produced by the enable signal producing section 140, and outputs write data to the supplementary processing unit 300 in synchronization with the write enable signal WE1 produced by the enable signal producing section 140.

The function of the first processing unit 100 having this structure is provided by integrated circuits such as a CPU, a microprocessor, a DSP (digital signal processor) and others.

Figures 3, 4:
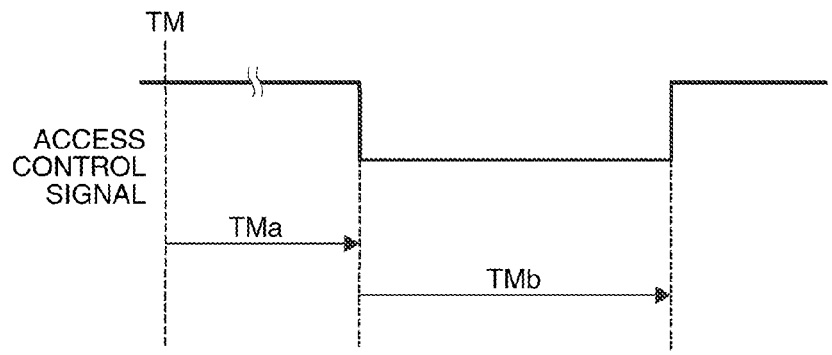
FIG. 3 illustrates timing information according to this embodiment.
FIG. 4 illustrates an example of an address space accessed by a first processing unit.

FIG. 3 illustrates timing information according to this embodiment. According to the example shown in FIG. 3, the level at the time of assertion corresponds to L level, and the level at the time of negation corresponds to H level. However, the invention is not limited to this specific example.

The timing setting register 130 retains control data corresponding to timing information which contains timing TMa for negation and timing TMb for assertion from a reference of predetermined reference timing TM in advance. The control data corresponding to this timing information is given to the timing setting register 130 before access by the first processing unit 100. The timing setting register 130 is provided for each of the access control signals. In addition, the timing setting register 130 for specifying the timing of the respective access control signals is provided for each address space to be accessed such that each address space can be accessed in different access timing.

While the timing TMb corresponds to the pulse width of the access control signal in the example shown in FIG. 3, the timing TMb may specify the width from the reference of the reference timing TM to the timing of negation after the end of assertion.

As illustrated in FIG. 2, the second processing unit 200 includes a control register 210, a data buffer 220, an arbiter 230, a host controller 240, and a controller 250. In this embodiment, the first processing unit 100 accesses either the control register 210 or the data buffer 220 contained in the second processing unit 200. The second processing unit 200 connects with first device DV1, second device DV2 through Mth device DVM (M: natural number) to control data transmission to one of the first device DV1 through the Mth device DVM.

The control register 210 is constituted by a plurality of registers. These registers are associated with addresses allocated within the second processing unit 200 such that control data can be read from and written to the register corresponding to the specified address. The control register 210 retains control data for specifying the operation of the second processing unit 200. The data transmission between the second processing unit 200 and one of the first device DV1 through the Mth device DVM is controlled by specifying transmission mode, transmission direction, transmission data size and other conditions based on the control data given to the control register 210 from the first processing unit 100. Thus, the second processing unit 200 performs various controls based on the control data retained in the control register 210.

The data buffer 220 has memory areas associated with addresses. By specifying successive addresses, the memory areas designated by the respective addresses can be accessed. Data transferred from the first device DV1 through the Mth device DVM are accumulated in the data buffer 220 and read therefrom by the first processing unit 100 as necessary. Data may be written to the data buffer 220 of the second processing unit 200 by the first processing unit 100 as necessary such that the data can be written to any of the first device DV1 through the Mth device DVM.

The arbiter 230 arbitrates transmission of read data or write data of the control register 210, the data buffer 220, and the host controller 240. The arbiter 230 connected with the data buffer 220, the host controller 240, and the controller 250 for arbitrating bus occupation requirements gives bus control priority to one of these sections. The section having received the bus control priority from the arbiter 230 can control transmission and reception of data to and from the supplementary processing unit 300.

The host controller 240 controls transmission of serial data between the first device DV1 through the Mth device DVM. The host controller 240 has a plurality of interface circuits. A serial bus containing differential signal lines in conformity to USB (universal serial bus) standards is connected between the respective interface circuits and the first device DV1 through the Mth device DVM such that data transmission control in conformity to USB standards can be performed. Serial data read from the respective devices by the host controller 240 is accumulated in the data buffer 220. The accumulated data in the data buffer 220 is controlled to be written to the respective device by the host controller 240.

The controller 250 receives the access control signal produced by the supplementary processing unit 300 based on the access control signal received from the first processing unit 100, and controls the respective sections included in the second processing unit 200 based on the control data retained in the control register 210 to perform serial/parallel conversion or parallel/serial conversion. More specifically, when the chip select signal CS 0 is asserted, the controller 250 controls output of data in synchronization with a read enable signal RE_0 or reception of data in synchronization with a write enable signal WE_0 to or from the resource specified by the lower address AD2 (the control register 210 or the data buffer 220). The controller 250 or the respective sections controlled by the controller 250 issue bus occupation requirements to the arbiter 230 to control transmission of data in synchronization with the access control signal.

The function of the second processing unit 200 having this structure is provided by an integrated circuit such as a dedicated circuit containing ASIC (application specific integrated circuit) or the like, and a rewritable logic device containing CPLD (complex programmable logic device), FPGA (field programmable gate array) or the like.

According to this embodiment, the first processing unit 100 accesses the control register 210 of the second processing unit 200 by a first access method. On the other hand, the first unit 100 accesses the data buffer 220 of the second processing unit 200 by a second access method. In this embodiment, an example of register access in which the first processing unit 100 having selected the second processing unit 200 outputs a read enable signal or a write enable signal to the control register 210 to access the control register 210 is discussed. According to the first access method in this example, control data can be read from or written to the control register 210 by a small number of access cycles such as one cycle or two cycles. On the other hand, as for the second access method, the data buffer 220 stores data in the successive memory areas associated with the addresses. Thus, an example of block access in which the first processing unit 100 having selected the second processing unit 200 outputs a read enable signal or a write enable signal to the data buffer 220 while specifying the addresses to repeatedly access the memory areas specified by the addresses is discussed. Accordingly, the block access is a method for accessing the data buffer 220 by repeatedly specifying successive addresses. The second access method can read and write a large quantity of data at high speed by accessing successive memory areas, and thus can reduce the burden on the software.

FIG. 4 illustrates an example of the address space accessed by the first processing unit 100. In the example shown in FIG. 4, the address area in the first processing unit 100 to which the address space accessed by the first processing unit 100 is allocated differs from the address area in the second processing unit 200 to which the address space accessed by the first processing unit 100 is allocated.

According to this embodiment, the address space accessible by the first processing unit 100 is divided into plural address areas, and the control register 210 of the second processing unit 200 and the data buffer 220 of the second processing unit 200 are allocated to two of the divided address areas. For example, when the address space accessible by the first processing unit 100 is a 32-bit address space, "0x0400_0000-0x0400_0fff" ("0x" indicates hexadecimal) is allocated to the control register 210 in the first processing unit 100. In this case, "0x0400_$_{1000}$_0x0400_ffff" is allocated to the data buffer 220. On the other hand, in the second processing unit 200, "0x0000-0x0fff" is allocated to the control register 210, and "0x1000-0xffff" is allocated to the data buffer 220 in a 16-bit address space. Thus, whether the resource of the second processing unit 200 is accessed or not is determined based on the upper address AD3 of the address AD1 corresponding to the address space accessed by the first processing unit 100, and which of the resources of the second processing unit 200 is accessed is determined based on the lower address AD2 of the address AD1. Then, the first processing unit 100 performs access control by the access method corresponding to the resource finally determined. Accordingly, by the arrangement which allocates the predetermined address spaces of the second processing unit 200 to the plural address spaces in the address space of the first processing unit 100, the second processing unit 200 can be accessed by the access method corresponding to the address space selected by the first processing unit 100.

As described above, the chip select signal asserted by the first processing unit 100 is switched according to the access method. Thus, the supplementary processing unit 300 determines the access method and outputs the access control signal corresponding to the determined access method to the second processing unit 200. This function of the supplementary processing unit 300 may be contained in either of the first processing unit 100 or the second processing unit 200.

As shown in FIG. 2, the supplementary processing unit 300 includes a decoder 310, a read enable signal producing section 320, a write enable signal producing section 330, and a data buffer 340.

The decoder 310 receives the upper address AD3 of the address AD1 outputted from the first processing unit 100, and first chip select signal CS1 through Nth chip select signal CSN (N is 2 in this embodiment). Then, the decoder 310 decodes the upper address AD3 and the first chip select signal CS1 through the Nth chip select signal CSN, and asserts a chip select signal CS_0 based on the decode result. The chip select signal CS_0 is inputted to the second processing unit 200. When the chip select signal CS_0 is asserted, the second processing unit 200 is selected.

FIG. 5 illustrates an operation example of the decoder 310. FIG. 5 shows an example in which the chip select signal CS_0 having the active level at the L level is asserted based on the upper address AD3 and the first chip select signal CS1 through the Nth chip select signal CSN. In FIG. 5, it is assumed that the first chip select signal CS1 through the Nth chip select signal CSN are device select signals for the respective resources of the second processing unit 200.

The decoder 310 determines whether the access target is the control register 210 or the data buffer 220 of the second processing unit 200 based on the upper address AD3. Then, the decoder 310 produces different decode results according to the determination whether the first chip select signal CS1 through the Nth chip select signal CSN are asserted or not. More specifically, when it is determined that the access target does not designate the control register 210 or the data buffer 220 of the second processing unit 200 based on the upper address AD3, the decoder 310 negates the chip select signal CS_0 regardless of the determination whether the first chip select signal CS1 through the Nth chip select signal CSN are asserted or not. When it is determined that the access target designates the control register 210 or the data buffer 220 of the second processing unit 200 based on the upper address AD3, the decoder 310 asserts the chip select signal CS_0 provided that any of the first chip select signal CS1 through the Nth chip select signal CSN is asserted. When all of the first chip select signal CS1 through the Nth chip select signal CSN are negated, the decoder 310 negates the chip select signal CS_0 even under the determination that the access target designates the control register 210 or the data buffer 220 of the second processing unit 200 based on the upper address AD3. Thus, when the decoder 310 is provided, the access method can be switched at high speed by a smaller number of access control signals with simplified structure. The decode results of the decoder 310 thus produced are inputted to the read enable signal producing section 320, the write enable signal producing section 330, and the data buffer 340.

As shown in FIG. 2, the read enable signal producing section 320 receives the read enable signal RE1 from the first processing unit 100 and produces a read enable signal RE_0 based on the decode result of the decoder 310, and outputs the read enable signal RE_0 to the second processing unit 200. More specifically, when the chip select signal CS 0 is asserted based on the decode result from the decoder 310, the read enable signal producing section 320 asserts the read enable signal RE_0 in timing corresponding to the read enable signal RE1 received from the first processing unit 100. Then, the read enable signal producing section 320 transmits data read from the second processing unit 200 to the first processing unit 100 via the data buffer 340. When the chip select signal CS_0 is negated based on the decode result from the decoder 310, the read enable signal producing section 320 negates the read enable signal RE_0 regardless of the change of the read enable signal RE1.

The write enable signal producing section 330 receives the write enable signal WE1 from the first processing unit 100 and produces a write enable signal WE_0 based on the decode result from the decoder 310, and then outputs the write enable signal WE_0 to the second processing unit 200. More specifically, when the chip select signal CS_0 is asserted based on the decode result from the decoder 310, the write enable signal producing section 330 asserts the write enable signal WE_0 in timing corresponding to the write enable signal WE1 received from the first processing unit 100. Then, the write enable signal producing section 330 transmits the data received from the first processing unit 100 to the second processing unit 200 via the data buffer 340. When the chip select signal CS_0 is negated based on the decode result from the decoder 310, the write enable signal producing section 330 negates the write enable signal WE_0 regardless of the change of the write enable signal WE1.

The data buffer 340 also receives the decode results from the decoder 310. Thus, when the chip select signal CS_0 is asserted based on the decode result from the decoder 310, the data buffer 340 receives data from the first processing unit 100 under the control of the write enable signal producing section 330, and outputs the data to the second processing unit 200. Alternatively, when the chip select signal CS_0 is asserted based on the decode result from the decoder 310, the data buffer 340 receives data from the second processing unit 200 under the control of the read enable signal producing section 320, and outputs the data to the first processing unit 100.

According to the information processing device 10 having this structure, the first processing unit 100 accesses the second processing unit 200 by the following access method.

Figure 6:
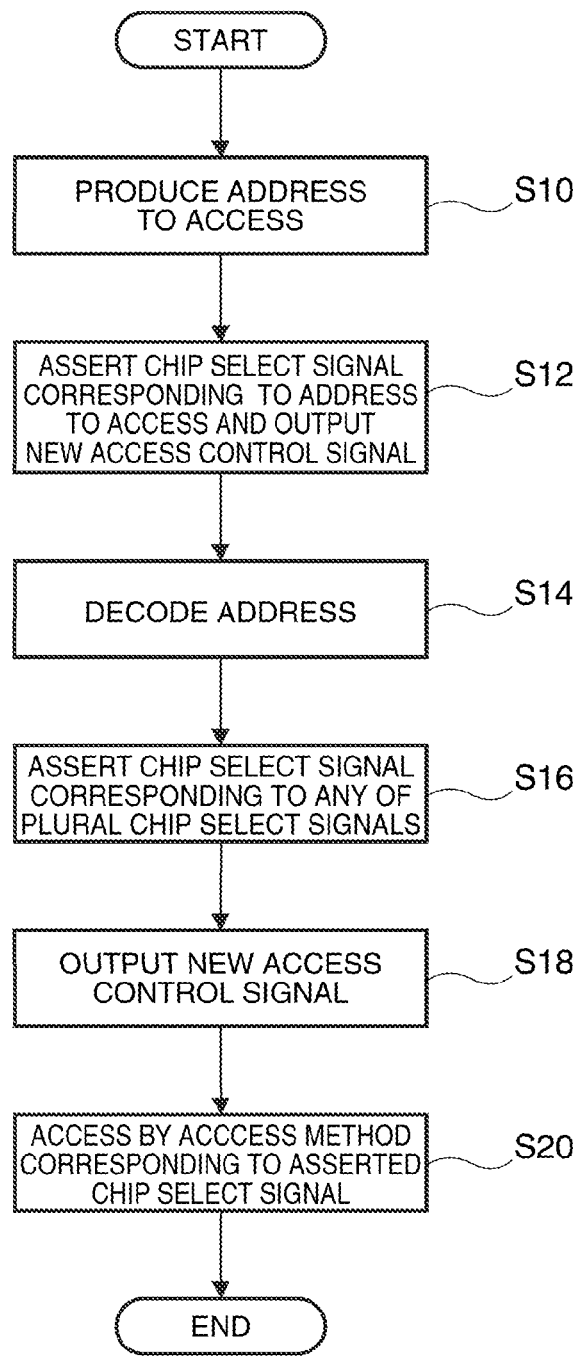
FIG. 6 is a flowchart showing an example of an access method performed by the information processing device shown in FIG. 1.

FIG. 6 is a flowchart showing an example of the access method performed by the information processing device 10 shown in FIG. 1.

Initially, the first processing unit 100 in the information processing device 10 produces an address for access as an access address producing step (step S10). In this step, the address signal producing section 110 of the first processing unit 100 produces an address corresponding to any of the address spaces allocated to the resources of the second processing unit 200 in advance as shown in FIG. 4 when issuing an access cycle. Then, the first processing unit 100 asserts the chip select signal corresponding to the address produced in step S10 (the first chip select signal CS1 or the second chip select signal CS2), and outputs a new access signal as an access control signal output step (chip select signal output step) (step S12). That is, the chip select signal producing section 120 of the first processing unit 100 produces the chip select signal corresponding to any of the address spaces allocated to the resources of the second processing unit 200 in advance as shown in FIG. 4 and simultaneously produces a new access control signal in timing specified by the timing setting register 130, and then outputs these signals.

After step S12, an access step for allowing the first processing unit 100 to access the second processing unit 200 is initiated. The supplementary processing unit 300 having received the address and the plural chip select signals from the first processing unit 100 decodes the address and the plural chip select signals received from the first processing unit 100 as a decode step (step S14), and asserts the chip select signal corresponding to the second processing unit 200 based on the decode result (step S16). More specifically, the decoder 310 of the supplementary processing unit 300 decodes the upper address AD3 and the plural chip select signals (the first chip select signal CS1 and the second chip select signal CS2) received from the first processing unit 100 as shown in FIG. 5. When it is determined that the resource of the second processing unit 200 is the access target in the access cycle issued by the first processing unit 100, the supplementary processing unit 300 asserts the chip select signals corresponding to the plural chip select signals received from the first processing unit 100. Then, the read enable signal producing section 320 or the write enable signal producing section 330 of the supplementary processing unit 300 receives the read enable signal RE1 or the write enable signal WE1 from the first processing unit 100, and produces the read enable signal RE_0 or the write enable signal WE_0 for the second processing unit 200 (step S18) as an access control signal reproduction step.

The second processing unit 200 having received the access control signal produced in step S16 and step S18 controls the respective sections under the controller 250 to perform access control in synchronization with the access control signal received from the supplementary processing unit 300. Similarly, the supplementary processing unit 300 performs access control in synchronization with the access control signal received from the first processing unit 100 (step S20). Then, a series of processes end (END).

According to this embodiment, the first processing unit 100 outputs the plural chip select signals to the second processing unit 200, and the second processing unit 200 receives one of the chip select signals to be accessed by the access method corresponding to the chip select signal asserted by the first processing unit 100. In this embodiment, access control for the second processing unit 200 accessible by a plurality of access methods is performed in correspondence with the access target by changing chip select signals to be asserted different for each access target. Thus, the access methods for an identical device can be switched at high speed.

Figure 7:
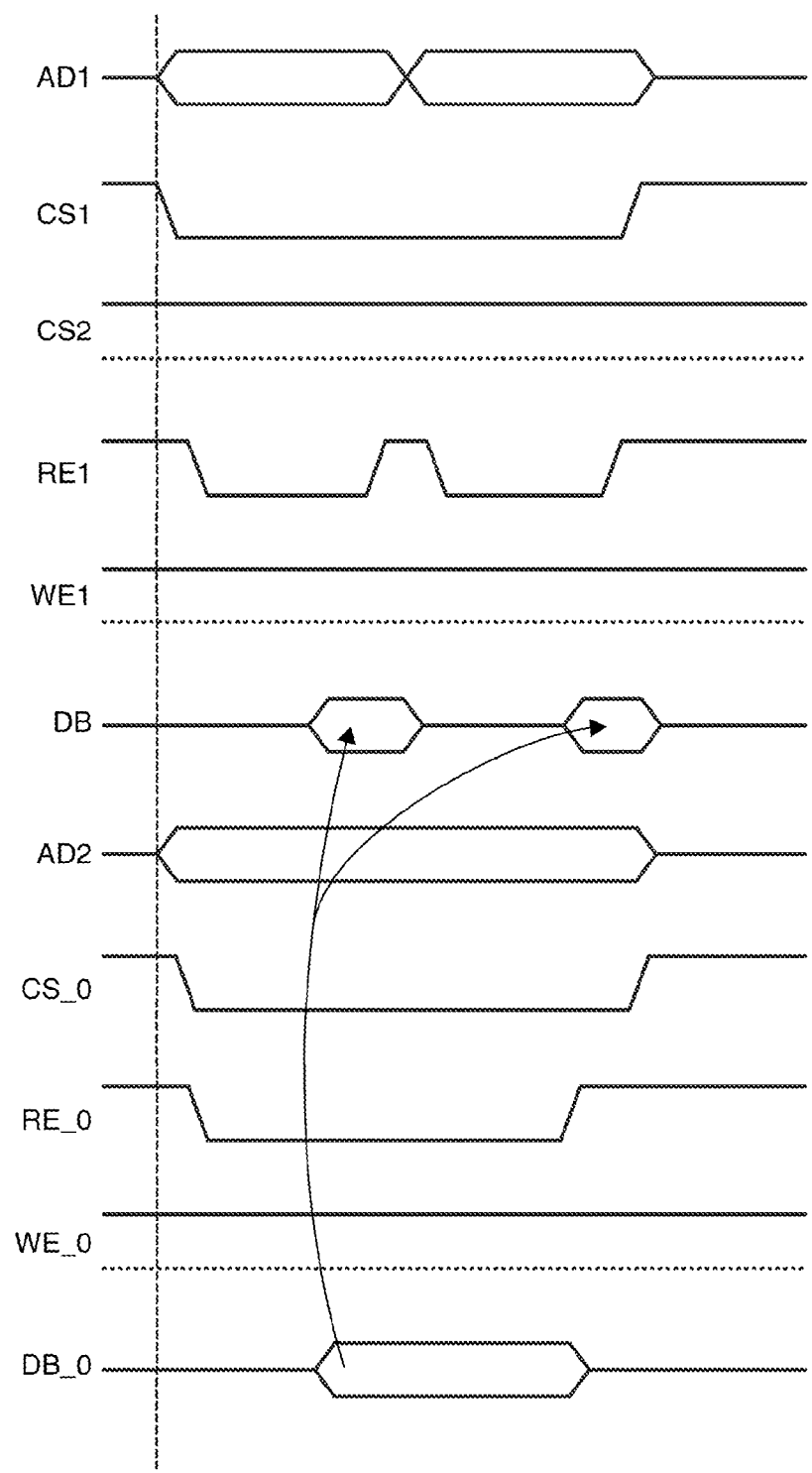
FIG. 7 illustrates an example of specific timing of register access as a first access method according to this embodiment.

FIG. 7 illustrates an example of specific timing of register access as the first access method in this embodiment. In FIG. 7, the same reference numbers are given to parts same as those in FIG. 2, and the same explanation is not repeated. FIG. 7 shows a timing example of register access in which the first processing unit 100 reads the control register 210 of the second processing unit 200.

The first processing unit 100 outputs the address AD1 allocated to the control register 210 of the second processing unit 200, and simultaneously asserts the first chip select signal CS1 and negates the second chip select signal CS2. In addition, the first processing unit 100 asserts the read enable signal RE1 during the assert period of the first chip select signal CS1. When the supplementary processing unit 300 decodes the address and the first chip select signal CS1 received from the first processing unit 100 and determines that the access target is the control register 210, the supplementary processing unit 300 asserts the chip select signal CS_0, and receives the read enable signal RE1 from the first processing unit 100 to produce the read enable signal RE_0.

The second processing unit 200 having received the chip select signal CS_0 and the read enable signal RE_0 from the supplementary processing unit 300 reads data from the control register 210 based on the lower address AD2 and outputs the data to the supplementary processing unit 300. The supplementary processing unit 300 temporarily stores the data read from the second processing unit 200 in the data buffer 340, and outputs a part of the data to the first processing unit 100 as it is. For example, when the DW1 and DW2 are 16 bits and 32 bits, respectively, only the data corresponding to 16 bits in the data of 32 bits read from the second processing unit 200 and accumulated in the data buffer 340 is initially outputted to the first processing unit 100.

Then, the first processing unit 100 again issues a similar access cycle to the supplementary processing unit 300. In this case, the supplementary processing unit 300 outputs the remaining data of 16 bits accumulated in the data buffer 340 to the first processing unit 100 in the second access cycle. Thus, when accessing the control register 210 of the second processing unit 200, the first processing unit 100 asserts the first chip select signal CS1 and issues the read cycle twice to read 32-bit data.

Figure 8:
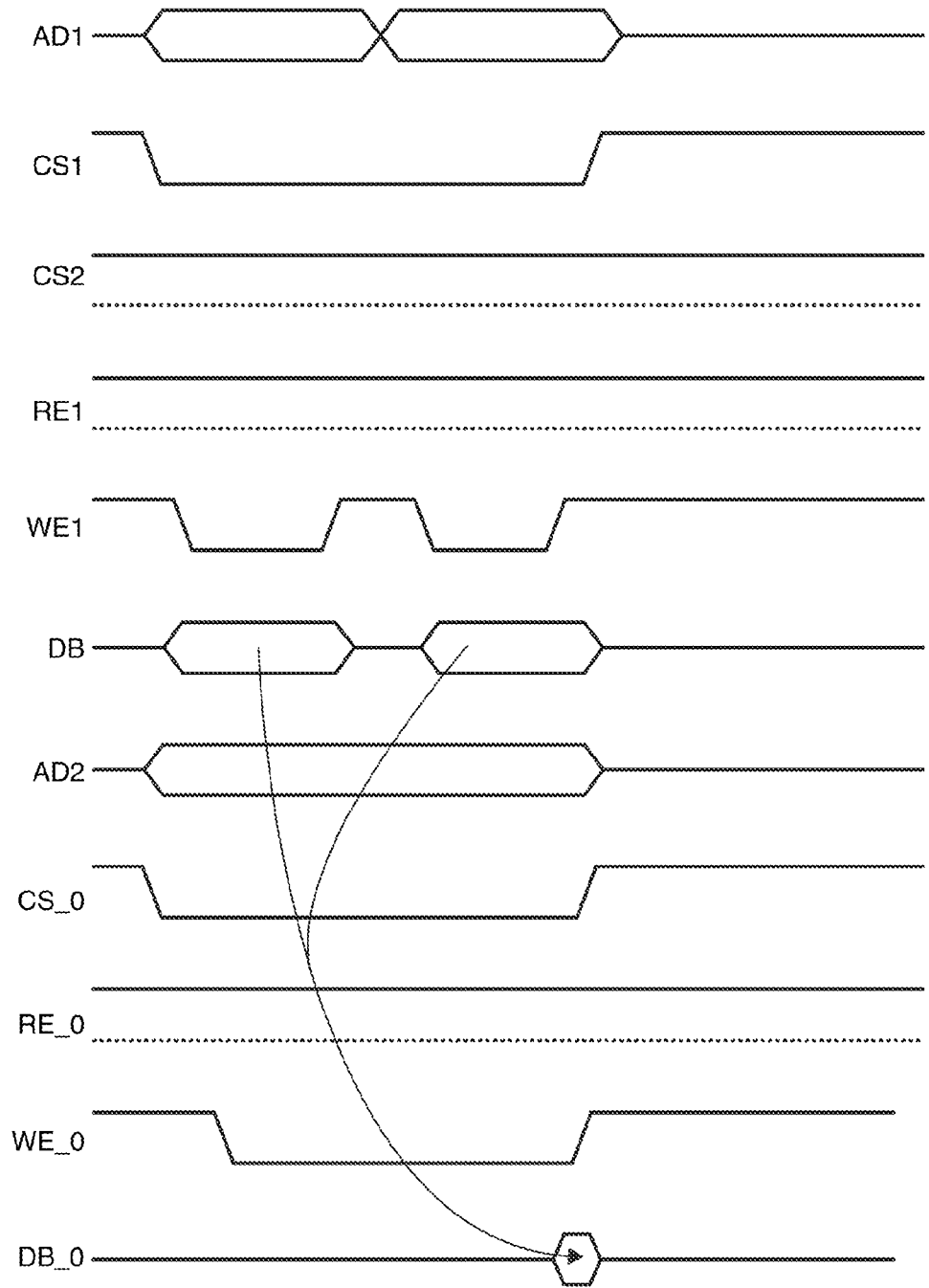
FIG. 8 illustrates another example of specific timing of register access as the first access method according to this embodiment.

FIG. 8 illustrates another example of specific timing of register access as the first access method in this embodiment. In FIG. 8, the same reference numbers are given to parts same as those in FIG. 2, and the same explanation is not repeated. FIG. 8 shows a timing example of register access in which the first processing unit 100 performs write access to the control register 210 of the second processing unit 200.

The first processing unit 100 outputs the address AD1 allocated to the control register 210 of the second processing unit 200, and simultaneously asserts the first chip select signal CS1 and negates the second chip select signal CS2. In addition, the first processing unit 100 asserts the write enable signal WE1 during the assert period of the first chip select signal CS1. Then, the first processing unit 100 outputs write data in synchronization with the timing of the first chip select signal CS1 and the write enable signal WE1.

When the supplementary processing unit 300 decodes the address and the first chip select signal CS1 received from the first processing unit 100 and determines that the access target is the control register 210, the supplementary processing unit 300 asserts the chip select signal CS 0, for example, and accumulates the write data received from the first processing unit 100 in the data buffer 340. Then, the first processing unit 100 again issues a similar access cycle to the supplementary processing unit 300. The supplementary processing unit 300 accumulates the write data received from the first processing unit 100 in the data buffer 340 for each of the two write cycles received from the first processing unit 100. By this method, the data of 16 bits received from the first processing unit 100 can be read as the data of 32 bits.

Then, the supplementary processing unit 300 decodes the address and the first chip select signal CS1 received from the first processing unit 100, and receives the write enable signal WE1 from the first processing unit 100 while asserting the chip select signal CS 0 to produce the write enable signal WE O. Simultaneously, the supplementary processing unit 300 outputs the data of 32 bits accumulated in the data buffer 340 as write data.

The second processing unit 200 having received the chip select signal CS 0, the write enable signal WE 0, and the write data from the supplementary processing unit 300 performs write control the write data to the control register 210 based on the lower address AD2.

According to this embodiment, the chip select signal CS_0 and the lower address AD2 become active at the time of first access cycle issue from the first processing unit 100 as shown in the figure. However, the invention is not limited to this example.

Figure 9:
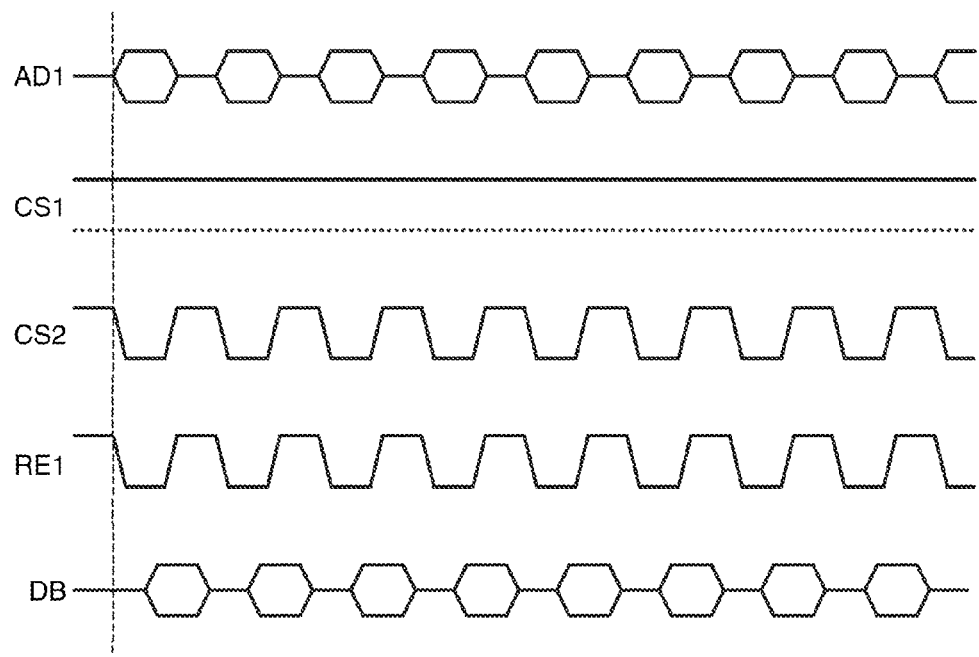
FIG. 9 illustrates an example of specific timing of block access as a second access method according to this embodiment.
Figure 10:
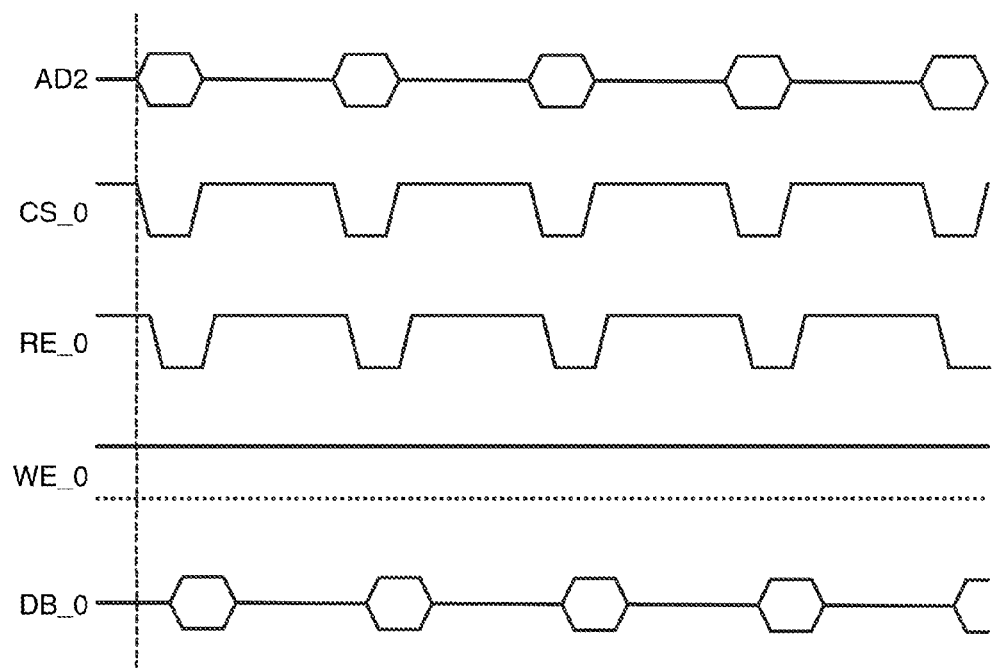
FIG. 10 illustrates the example of specific timing of block access as the second access method according to this embodiment.

FIGS. 9 and 10 show a specific timing example of block access as the second access method in this embodiment. FIGS. 9 and 10 illustrate a timing example of block access in which the first processing unit 100 reads the data buffer 220 of the second processing unit 200. FIG. 9 shows an example of the access control signal outputted from the first processing unit 100 to the supplementary processing unit 300. FIG. 10 shows an example of the access control signal outputted from the supplementary processing unit 300 to the second processing unit 200. In FIGS. 9 and 10, the same reference numbers are given to parts same as those in FIG. 2, and the same explanation is not repeated.

Prior to this access, it is assumed that the second processing unit 200 retains data transmitted in conformity to USB standards from any of the first device DV1 through the Mth device DVM and accumulated in the data buffer 220. For reading the data accumulated in the data buffer 220, the first processing unit 100 outputs the address AD1 allocated to the data buffer 220 of the second processing unit 200, and simultaneously negates the first chip select signal CS1 and asserts the second chip select signal CS2. In addition, the first processing unit 100 asserts the read enable signal RE1 during the assertion period of the second chip select signal CS2. In this case, the first processing unit 100 performs block transmission of read data by repeating successive designation of the addresses allocated to the data buffer 220. According to this block access, the output period and the assertion period of the read enable signal RE1 in each read cycle are shorter than those in the register access such that high-speed data transmission can be achieved.

When the supplementary processing unit 300 decodes the address and the second chip select signal CS2 received from the first processing unit 100 and determines that the access target is the data buffer 220, the supplementary processing unit 300 asserts the chip select signal CS_0 and receives the read enable signal RE1 from the first processing unit 100 to produce the read enable signal RE_0.

The second processing unit 200 having received the chip select signal CS_0 and the read enable signal RE_0 from the supplementary processing unit 300 reads the data from the data buffer 220 based on the lower address AD2 and outputs the data to the supplementary processing unit 300. The supplementary processing unit 300 temporarily accumulates the data read from the second processing unit 200 in the data buffer 340, and outputs a part of the data to the first processing unit 100 as it is. For example, when the DW1 and DW2 are 16 bits and 32 bits, respectively, only the data corresponding to 16 bits in the data of 32 bits read from the second processing unit 200 and accumulated in the data buffer 340 is initially outputted to the first processing unit 100.

Then, the first processing unit 100 again issues a similar access cycle to the supplementary processing unit 300. In this case, the supplementary processing unit 300 outputs the remaining data of 16 bits accumulated in the data buffer 340 to the first processing unit 100 in the second access cycle. Thus, when accessing the data buffer 220 of the second processing unit 200, the first processing unit 100 asserts the second chip select signal CS2 and issues the read cycle twice to read 32-bit data.

In the block access, the chip select signal CS_0 (or the second chip select signal CS2) asserted in the first access cycle may be latched until the block access is completed a predetermined number of times such that the block access can be completed regardless of the chip select signal CS_0.

As explained above, the change timing of the access control signal outputted from the supplementary processing unit 300 to the second processing unit 200 by the first access method is different from the change timing of the access control signal outputted from the supplementary processing unit 300 to the second processing unit 200 by the second access method. In this embodiment, the function of block access for writing to the resource of the second processing unit 200 by the first processing unit 100 is not described. However, the block access for writing to the data buffer 220 of the second processing unit 200 can be conducted as the second access method similarly to the example shown in FIGS. 9 and 10.

Accordingly, the information processing device 10 can switch the access method at high speed for the device accessible by plural access methods. When the information processing device 10 having this structure is applied to an image display device displaying a large-sized screen image with high accuracy, image data can be received from a plurality of sources while being switched at high speed.

Figure 11:
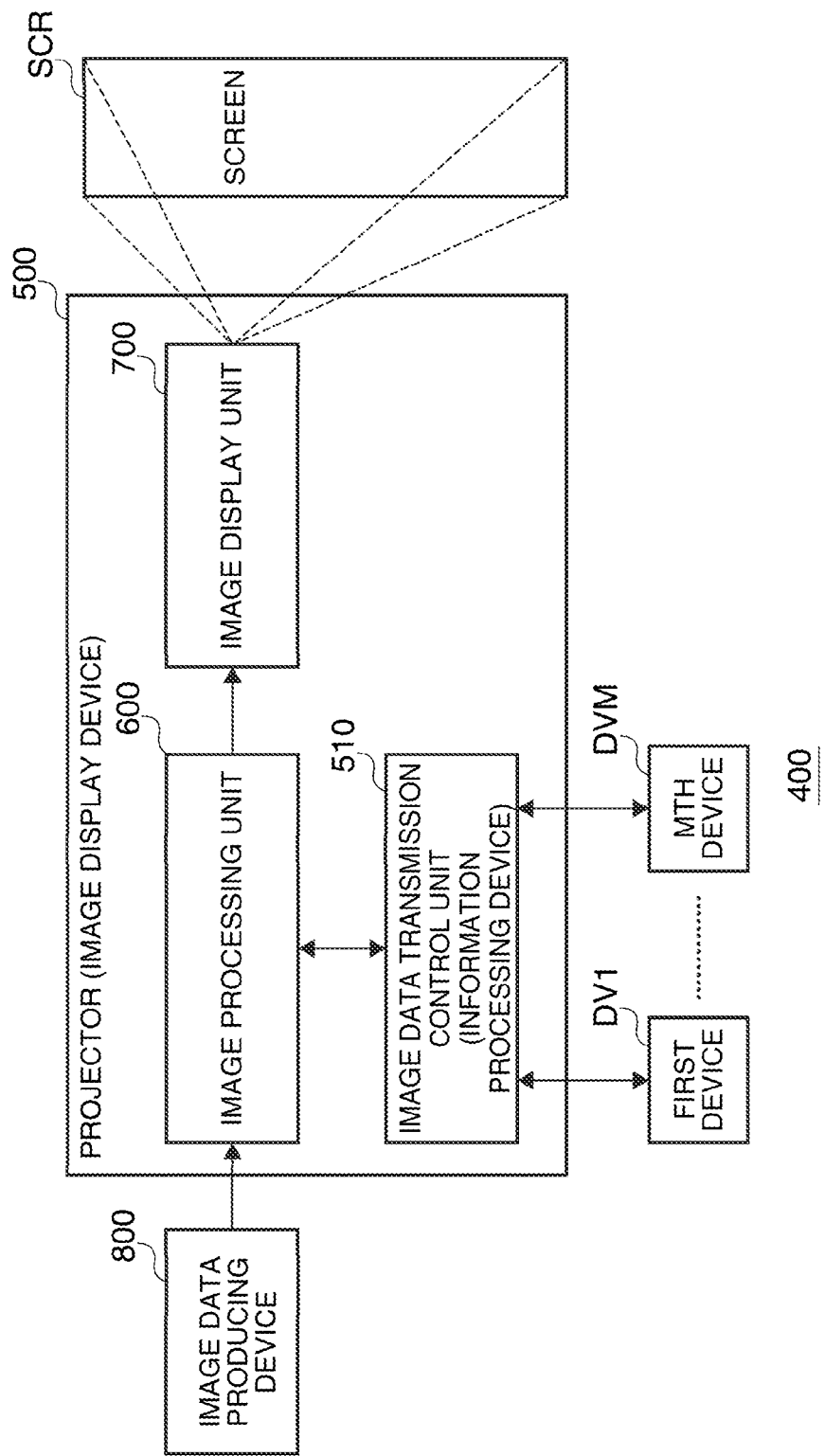
FIG. 11 is a block diagram showing a structure example of an image display system including an image display device according to this embodiment.

FIG. 11 is a block diagram showing a structure example of an image display system including an image display device according to this embodiment. In FIG. 11, the same reference numbers are given to part same as those in FIG. 2, and the same explanation is not repeated. While a projector as an image production device is discussed as the image display device in this embodiment, the invention is not limited to this example.

An image display system 400 in this embodiment includes a projector 500 as the image display device, the first device DV1 through the Mth device DVM, an image data producing device 800, and a screen SCR. According to the image display system 400, the projector 500 can project an image based on the image data corresponding to an image produced by the image data producing device 800 on the screen SCR. The image data producing device 800 is constituted by a scanner, a digital camera, or a personal computer (PC), for example. The function of the image data producing device 800 may be included in the projector 500.

The projector 500 may project an image on the screen SCR based on image data received from any of the first device DV1 through the Mth device DVM in addition to or in place of the image data received from the image data producing device 800. The projector 500 connects with the first device DV1 through the Mth device DVM via a serial bus constituted by signal lines in conformity to USB standards such that image data can be accumulated under data transmission control in conformity to USB standards.

The projector 500 includes an image data transmission control unit 510 having the information processing device 10 according to this embodiment, an image processing unit 600, and an image display unit 700. The projector 500 is so structured as to connect with the first device DV1 through the Mth device DVM shown in FIG. 2 via the serial bus constituted by signal lines in conformity to USB standards. The image data transmission control unit 510 converts data transmitted from any of the first device DV1 through the Mth device DVM via the serial bus into parallel data to accumulate the parallel data in an internal data buffer. The image processing unit 600 performs predetermined image processing for the image data received from the image data producing device 800 or the image data transmission control unit 510. This image processing includes image shape correction, gradation correction, luminance correction, chromaticity correction, edge emphasis, or other known processing. The image display unit 700 has a light source and a light valve, for example, and modulates light emitted from the light source based on the image data processed by the image processing unit 600 and expands and projects the modulated light.

Figure 12:
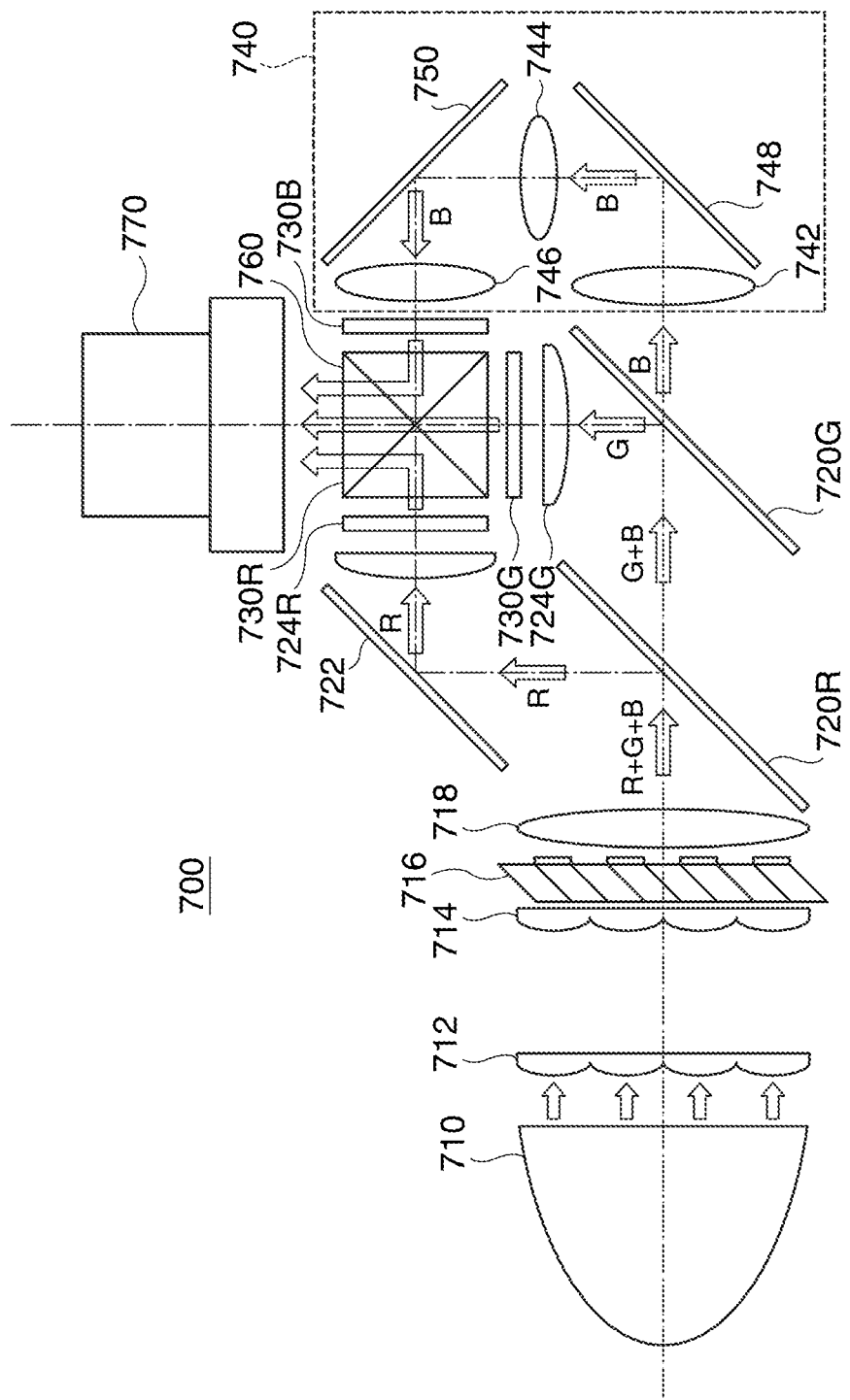
FIG. 12 illustrates a structure example of an image display unit shown in FIG. 11.

FIG. 12 illustrates a structure example of the image display unit 700 shown in FIG. 11. In FIG. 12, the same reference numbers are given to parts same as those in FIG. 11, and the same explanation is not repeated. While the image display unit 700 has the structure shown in FIG. 11, the structure of the image display unit of the projector according to the invention is not limited to the structure shown in FIG. 11.

The image display unit 700 shown in FIG. 11 has a three plate type light transmissive liquid crystal panel as the light valve, for example. While it is assumed herein that one pixel is constituted by R component sub pixel, G component sub pixel, and B component sub pixel, the number of sub pixels constituting one pixel (number of color components) is not specifically limited. The image display unit 700 includes a light source section 710, integrator lenses 712 and 714, a polarization converting element 716, a stacking lens 718, an R component dichroic mirror 720R, a G component dichroic mirror 720G, a reflection mirror 722, an R component field lens 724R, a G component field lens 724G, an R component liquid crystal panel 730R (first light modulation unit), a G component liquid crystal panel 730G (second light modulation unit), a B component liquid crystal panel 730B (third light modulation unit), a relay system 740, a cross dichroic prism 760, and a projection lens 770. The liquid crystal panels used as the R component liquid crystal panel 730R, the G component liquid crystal panel 730G, and the B component liquid crystal panel 730B are transmission type liquid crystal display devices. The relay system 740 has relay lenses 742, 744, and 746, and reflection mirrors 748 and 750.

The light source section 710 is constituted by an extra-high pressure mercury lamp, and emits light containing at least R component light, G component light, and B component light. The integrator lens 712 has a plurality of small lenses for dividing light emitted from the light source section 710 into a plurality of partial lights. The integrator lens 714 has a plurality of small lenses in correspondence with the plural small lenses of the integrator lens 712. The stacking lens 718 stacks the partial lights received from the plural small lenses of the integrator lens 712 on the liquid crystal panels.

The polarization converting element 716 has a polarization beam splitter array and a λ/2 film, and converts the lights emitted from the light source section 710 into substantially one type of polarized lights. The polarization beam splitter array has polarization separation films for separating the partial lights divided by the integrator lens 712 into p-polarized lights and s-polarized lights, and reflection films for changing the directions of the lights received from the polarization separation films disposed such that the two types of films are alternately positioned. The polarization directions of the two types of polarized lights separated by the polarization separation films are equalized by the λ/2 film. The substantially one type of polarized light converted by the polarization converting element 716 is applied to the stacking lens 718.

The lights released from the stacking lens 718 enter the R component dichroic mirror 720R. The R component dichroic mirror 720R has a function of reflecting R component light and transmitting G component light and B component light. The light transmitted by the R component dichroic mirror 720R is applied to the G component dichroic mirror 720G, and the light reflected by the R component dichroic mirror 720R is reflected by the reflection mirror 722 and directed toward the R component field lens 724R.

The G component dichroic mirror 720G has a function of reflecting G component light and transmitting B component light. The light transmitted by the G component dichroic mirror 720G enters the relay system 740. The light reflected by the G component dichroic mirror 720G is directed to the G component field lens 724G.

The relay system 740 corrects the difference between the optical path lengths by using the relay lenses 742, 744, and 746 such that the optical path length of the B component light transmitted by the G component dichroic mirror 720G and the optical path lengths of the other R component light and G component light can be reduced as much as possible. The light transmitted by the relay lens 742 is directed to the relay lens 744 by the reflection mirror 748. The light transmitted by the relay lens 744 is directed to the relay lens 746 by the reflection mirror 750. The light transmitted by the relay lens 746 is applied to the B component liquid crystal panel 730B.

The light applied to the R component field lens 724R is converted into collimated light and supplied to the R component liquid crystal panel 730R. The R component liquid crystal panel 730R functions as a light modulation unit (light modulation element), and varies transmissivity (rate of transmission or rate of modulation) according to an R component image signal. Thus, the light supplied to the R component liquid crystal panel 730R (light having first color component) is modulated according to the R component image signal, and the modulated light is supplied to the cross dichroic prism 760.

The light applied to the G component field lens 724G is converted into collimated light and supplied to the G component liquid crystal panel 730G. The G component liquid crystal panel 730G functions as a light modulation unit (light modulation element), and varies transmissivity (rate of transmission or rate of modulation) according to a G component image signal. Thus, the light supplied to the G component liquid crystal panel 730G (light having second color component) is modulated according to the G component image signal, and the modulated light is supplied to the cross dichroic prism 760.

The B component liquid crystal panel 730B to which the collimated light converted by the relay lenses 742, 744, and 746 is applied functions as a light modulation unit (light modulation element), and varies transmissivity (rate of transmission or rate of modulation) according to a B component image signal. Thus, the light supplied to the B component liquid crystal panel 730B (light having third color component) is modulated according to the B component image signal, and the modulated light is supplied to the cross dichroic prism 760.

Each of the R component liquid crystal panel 730R, the G component liquid crystal panel 730G, and the B component liquid crystal panel 730B has the same structure. Each of the liquid crystal panels is produced by sealing liquid crystals as electro-optic substances into a pair of transparent glass substrates, and modulates the transmissivity of the respective color lights in response to image signals for the respective sub pixels using polysilicon thin-film transistors as switching elements. In this embodiment, the liquid crystal panel as the light modulation unit is provided for each color component constituting one pixel, and each transmissivity of the liquid crystal panels is controlled according to the image signals corresponding to the sub pixels. More specifically, the image data for the sub pixel of R component is used for the control of transmissivity (rate of transmission or rate of modulation) of the R component liquid crystal panel 730R, the image data for the sub pixel of G component is used for the control of transmissivity of the G component liquid crystal panel 730G, and the image data for the sub pixel of B component is used for the control of transmissivity of the B component liquid crystal panel 730B. The image data for the respective color components is data obtained after predetermined image processing by the image processing unit 600. The image data supplied to the image processing unit 600 for image processing is data received by the image data transmission control unit 510 via the serial bus and converted into parallel data.

The cross dichroic prism 760 has a function of combining the lights received from the R component liquid crystal panel 730R, the G component liquid crystal panel 730G, and the B component liquid crystal panel 730B and outputting the combined light as emission light. The projection lens 770 is a lens for expanding and forming an output image on the screen SCR.

According to this embodiment, image data can be received not only from the image data producing device 800 but also from any of the plural devices connected via the serial bus while changing the access methods at high speed such that images can be displayed based on the image data. In addition, the image data transmission control unit 510 for controlling data transmission between the projector 500 and the devices connected via the serial bus can be controlled while switching the access methods at high speed.

The invention is not limited to the example of the information processing device 10 shown in FIGS. 1 and 2. For example, according to this embodiment, the access methods are switched by changing the change timing of the access control signal in accordance with the chip select signal asserted by the first processing unit 100. However, in the following modified examples of this embodiment, the access methods of the first processing unit for accessing the second processing unit accessible by plural access methods are switched by changing the type of access control signal in accordance with the chip select signal asserted by the first processing unit.

Figure 13:
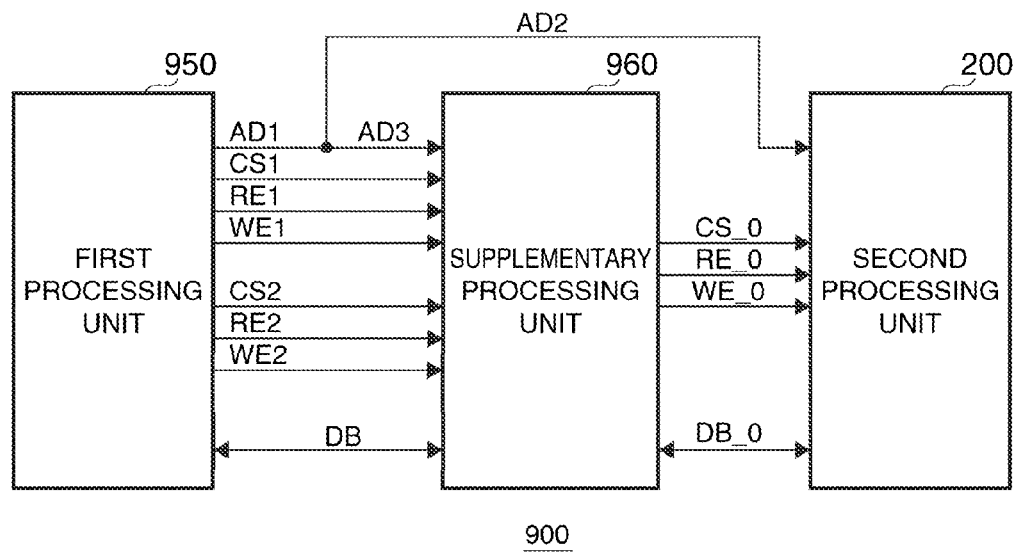
FIG. 13 shows the general structure of an information processing device according to a first modified example of this embodiment.

FIG. 13 illustrates the general structure of an information processing device according to a first modified example of this embodiment. While FIG. 13 shows only a second processing unit as a processing unit to be accessed by a first processing unit, the first processing unit may access plural processing units. In FIG. 13, the same reference numbers are given to parts same as those in FIG. 1, and the same explanation is not repeated.

An information processing device 900 in the first modified example includes a first processing unit 950, a supplementary processing unit 960, and the second processing unit 200. The information processing device 900 is different from the information processing device 10 of this embodiment in that the first processing unit 950 can vary the type of access control signal for each address space as access target. More specifically, the first processing unit 950 outputs the read enable signal and the write enable signal corresponding to the chip select signal, and the supplementary processing unit 960 produces the access control signal for the second processing unit 200 based on the read enable signal and the write enable signal corresponding to the asserted chip select signal.

The first processing unit 950 in the first modified example asserts the read enable signal or the write enable signal corresponding to the chip select signal in the enable signal producing section. Then, the supplementary processing unit 960 in the first modified example supplies the plural read enable signals or the plural write enable signals received from the first processing unit 950 to the read enable signal producing section or the write enable signal producing section, and outputs the access control signal to the second processing unit 200 based on the decode result from the decoder. In case of the first access method, for example, the first processing unit 950 outputs the first chip select signal CS1 and the access control signal corresponding to this signal in the timing shown in FIGS. 7 and 8. In the second access method, the first processing unit 950 outputs the second chip select signal CS2 and the access control signal corresponding to this signal in the timing shown in FIGS. 9 and 10. While the type of access control signal and the timing are varied according to the access methods in the first modified example, only the type of access control signal may be varied according to the access methods.

As apparent, in the first modified example of this embodiment, at least the type of access control signal is varied for switching the access methods. Thus, similarly to this embodiment, the second processing unit 200 can be accessed while switching the access methods at high speed.

Figure 14:
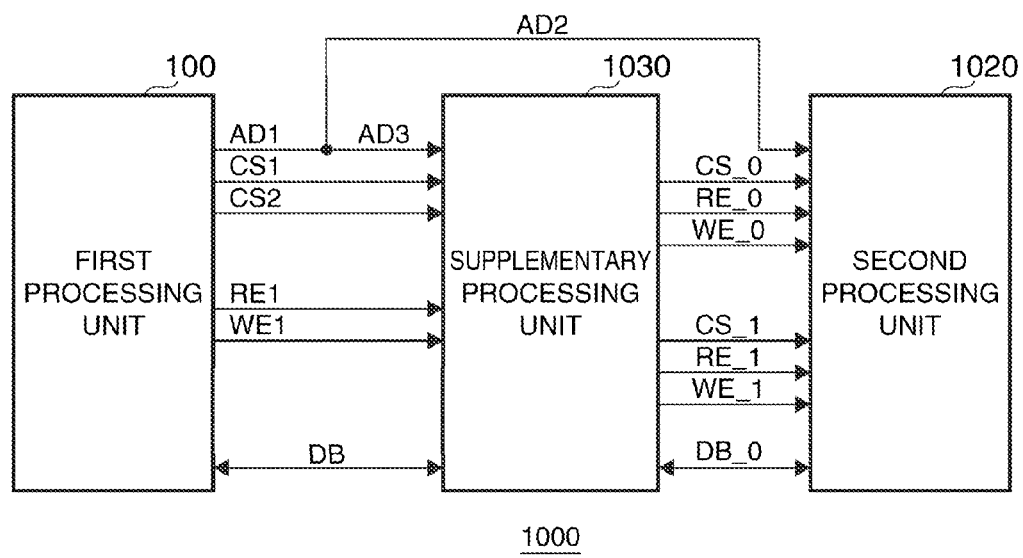
FIG. 14 shows the general structure of an information processing device according to a second modified example of this embodiment.

FIG. 14 illustrates the general structure of an information processing device in a second modified example. While FIG. 14 shows only a second processing unit as a processing unit to be accessed by a first processing unit, the first processing unit may access plural processing units. In FIG. 14, the same reference numbers are given to parts same as those in FIG. 1, and the same explanation is not repeated.

An information processing device 1000 in the second modified example includes the first processing unit 100, a second processing unit 1020, and a supplementary processing unit 1030. The information processing device 1000 is different from the information processing device 10 of this embodiment in that the supplementary processing unit 1030 can vary the type of access control signal for each address space as access target. More specifically, the supplementary processing unit 1030 outputs the read enable signal and the write enable signal corresponding to the chip select signal received from the first processing unit 100, and the second processing unit 1020 is accessed based on the read enable signal and the write enable signal corresponding to the chip select signal.

The supplementary processing unit 1030 in the second modified example produces the plural read enable signals corresponding to the chip select signal in the read enable signal producing section, and produces the plural write enable signals corresponding to the chip select signal in the write enable signal producing section. Then, the second processing unit 1020 in the second modified example receives the plural read enable signals or the plural write enable signals from the supplementary processing unit 1030, and the resource corresponding to the chip select signal is accessed based on the read enable signal or the write enable signal corresponding to the chip select signal. In case of the first access method, for example, the supplementary processing unit 1030 outputs the first chip select signal CS1 and the access control signal corresponding to this signal in the timing shown in FIGS. 7 and 8. In the second access method, the supplementary processing unit 1030 outputs the second chip select signal CS2 and the access control signal corresponding to this signal in the timing shown in FIGS. 9 and 10. While the type of access control signal and the timing are varied according to the access methods in the second modified example, only the type of access control signal may be varied according to the access methods.

As apparent, in the second modified example of this embodiment, at least the type of access control signal is varied for switching the access methods. Thus, similarly to this embodiment, the second processing unit can be accessed while switching the access methods at high speed.

Obviously, the information processing device 900 in the first modified example and the information processing device 1000 in the second modified example can be mounted on the projector 500 shown in FIG. 11 as the image data transmission control unit 510 similarly to this embodiment.

It is intended that the invention is not limited to the information processing device, the image display device, the information processing method and the like in the embodiment and the modified examples described herein but may be practiced otherwise without departing from the scope of the invention. For example, the following modifications may be made.

(1) While the information processing device performs serial/parallel conversion or parallel/serial conversion in the embodiment and the modified examples, the invention is not limited to this structure.

(2) According to the embodiment and the modified examples, the first processing unit chiefly outputs two types of chip select signal to either the supplementary processing unit or the second processing unit. However, the first processing unit may output three or more types of chip select signal to one processing unit.

(3) According to the embodiment and the modified examples, the type of access control signal and the timing in the first access method are different from those in the second access method. However, the invention is not limited to this structure.

(4) According to the embodiment and the modified examples, the access method for accessing the control register of the second processing unit is different from the access method for accessing the data buffer of the second processing unit. However, when the second processing unit has a plurality of functions, the access method may be varied for each of the functions of the second processing unit.

(5) According to the embodiment and the modified examples, the projector has been discussed as an example of the image display device. However, the image display device in this embodiment may be applied to all devices for image display such as a liquid display device, a plasma display device, and an organic EL display device.

(6) According to the embodiment and the modified examples, the light modulation unit (light modulation element) is a light valve having a transmission type liquid crystal panel. However, the light modulation element may be a DLP (digital light processing; registered trademark), an LCOS (liquid crystal on silicon) or the like.

(7) According to the embodiment and the modified examples, the light modulation unit is a light valve having a so-called three-plate type light transmissive liquid crystal panel. However, the light valve may be a single, two or at least four plate type light transmissive liquid crystal panel.

What is claimed is:

1. An information processing device comprising:
a first processing unit which asserts a first chip select signal or a second chip select signal in accordance with an address space to access; and
a second processing unit accessible by the first processing unit by a first access method or a second access method, the second processing unit including:
a control register accessible by the first processing unit,
a data buffer accessible by the first processing unit,
a host controller that has a plurality of interface circuits connected with a serial bus, and
an arbiter that arbitrates transmission of read data or write data between the control register, the data buffer, and the host controller;
wherein
when asserting the first chip select signal, the first processing unit accesses the second processing unit by the first access method,
when asserting the second chip select signal, the first processing unit accesses the second processing unit by the second access method,
the data buffer buffers data transmitted via the serial bus connected with respective interface circuits included in the plural interface circuits; and
serial/parallel conversion or parallel/serial conversion of the data transmitted via the serial bus connected with the interface circuits included in the plural interface circuits and arbitrated by the arbiter is performed.

2. The information processing device according to claim 1, wherein:
when asserting the first chip select signal, the first processing unit performs register access for accessing the control register; and
when asserting the second chip select signal, the first processing unit performs block access which repeatedly designates successive addresses for accessing the data buffer.

3. The information processing device according to claim 1, further comprising:
a supplementary processing unit which has a decoder for decoding the first chip select signal, the second chip select signal, and the address corresponding to the address space accessed by the first processing unit,
wherein the supplementary processing unit selects the second processing unit based on a decode result from the decoder.

4. The information processing device according to claim 3, wherein the supplementary processing unit switches between change timing of an access control signal outputted to the second processing unit by the first access method and change timing of an access control signal outputted to the second processing unit by the second access method based on the decode result from the decoder.

5. The information processing device according to claim 3, wherein types of access control signal used in the first access method and the second access method are switched based on the decode result from the decoder.

6. An image display device which displays an image corresponding to image data, comprising:
the information processing device according to claim 5 which receives image data as serial data via a device connected with the second processing unit and outputs the image data converted into parallel data;
an image processing unit which performs image processing for the image data received from the information processing device; and
an image display unit which displays an image corresponding to the image data after the image processing by the image processing unit.

7. An information processing method for an information processing device having a first processing unit and a second processing unit accessed by the first processing unit, the second processing unit including a control register accessible by the first processing unit, a data buffer accessible by the first processing unit, a host controller that has a plurality of interface circuits connected with a serial bus, and an arbiter that arbitrates transmission of read data or write data between the control register, the data buffer, and the host controller, the method comprising:
allowing the first processing unit to assert a first chip select signal or a second chip select signal according to an address space to be accessed;
allowing the first processing unit to access the second processing unit by an access method corresponding to the chip select signal asserted by the first processing unit:, buffering data transmitted via the serial bus connected with respective interface circuits included in the plural interface circuits; and performing serial/parallel conversion or parallel/serial conversion of the data transmitted via the serial bus connected with the interface circuits included in the plural interface circuits and arbitrated by the arbiter, wherein the first processing unit accesses the second processing unit by a first access method when asserting the first chip select signal, and accesses the second processing unit when asserting the second chip select signal.

8. An information processing device comprising:

a first processing unit which asserts a first chip select signal or a second chip select signal in accordance with an address space to access;

a second processing unit accessible by the first processing unit by a first access method or a second access method; and a supplementary processing unit that has a decoder for decoding the first chip select signal, the second chip select signal, and the address corresponding to the address space accessed by the first processing unit, wherein when asserting the first chip select signal, the first processing unit accesses the second processing unit by the first access method, when asserting the second chip select signal, the first processing unit accesses the second processing unit by the second access method, and the supplementary processing unit switches between change timing of an access control signal outputted to the second processing unit by the first access method and change timing of an access control signal outputted to the second processing unit by the second access method based on a decode result from the decoder.

9. An information processing method for an information processing device having a first processing unit, a second processing unit accessed by the first processing unit, and a supplementary processing unit that has a decoder, comprising:

allowing the first processing unit to assert a first chip select signal or a second chip select signal according to an address space to be accessed;

allowing the first processing unit to access the second processing unit by an access method corresponding to the chip select signal asserted by the first processing unit;

decoding the first chip select signal, the second chip select signal, and the address corresponding to the address space accessed by the first processing unit; and switching between change timing of an access control signal outputted to the second processing unit by the first access method and change timing of an access control signal outputted to the second processing unit by the second access method based on a decode result from the decoder, wherein the first processing unit accesses the second processing unit by a first access method when asserting the first chip select signal, and accesses the second processing unit when asserting the second chip select signal.

* * * * *